(12) United States Patent
Komura (10) Patent No.: US 10,665,843 B2
(45) Date of Patent: May 26, 2020

(54) SEPARATOR-INTEGRATED ELECTRODE PLATE AND CAPACITOR ELEMENT

(71) Applicant: TOYOTA JIDOSHA KABUSHIKI KAISHA, Toyota-shi, Aichi (JP)

(72) Inventor: Shingo Komura, Nagakute (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 81 days.

(21) Appl. No.: 15/675,886

(22) Filed: Aug. 14, 2017

(65) Prior Publication Data

US 2018/0097218 A1 Apr. 5, 2018

(30) Foreign Application Priority Data

Oct. 3, 2016 (JP) ................. 2016-195915

(51) Int. Cl.
| | | |
|---|---|---|
| *H01G 11/52* | (2013.01) | |
| *H01M 10/42* | (2006.01) | |
| *H01M 2/16* | (2006.01) | |
| *H01M 10/0525* | (2010.01) | |
| *H01M 10/052* | (2010.01) | |
| *H01G 9/02* | (2006.01) | |
| *H01M 10/0585* | (2010.01) | |

(52) U.S. Cl.
CPC .......... *H01M 2/1673* (2013.01); *H01G 11/52* (2013.01); *H01M 2/1653* (2013.01); *H01M 2/1686* (2013.01); *H01M 10/0525* (2013.01); *H01M 10/4235* (2013.01); *H01G 9/02* (2013.01); *H01M 10/052* (2013.01); *H01M 10/0585* (2013.01); *Y02E 60/13* (2013.01); *Y02T 10/7022* (2013.01)

(58) Field of Classification Search
CPC ....... H01G 9/02; H01G 11/52; H01M 2/1673; H01M 10/0525; H01M 2/1686; H01M 2/1653; H01M 10/4235; H01M 10/052; H01M 10/0585
See application file for complete search history.

(56) References Cited

U.S. PATENT DOCUMENTS

| | | | |
|---|---|---|---|
| 6,180,282 B1 | 1/2001 | Nishida et al. | |
| 8,852,788 B2* | 10/2014 | Wakizaka | ............. H01M 2/145 |
| | | | 429/144 |
| 9,853,268 B2* | 12/2017 | Ryu | ...................... H01M 2/145 |

(Continued)

FOREIGN PATENT DOCUMENTS

| | | |
|---|---|---|
| CN | 103682247 A | 3/2014 |
| CN | 105470435 A | 4/2016 |

(Continued)

*Primary Examiner* — Nathan Milakovich
(74) *Attorney, Agent, or Firm* — Sughrue Mion, PLLC (57) ABSTRACT

A separator-integrated electrode plate includes a current collecting sheet; an active material layer provided on the current collecting sheet, and a separator layer provided on the active material layer and configured to allow ions in electrolyte to pass through. The separator layer includes a polyimide layer provided on the active material layer and made of polyimide that has been melted in a solvent and then deposited as a film, and a polyolefin particle layer provided on the polyimide layer and made of polyolefin resin particles accumulated on the polyimide layer, the polyolefin resin particles having a melting point of 140° C. or less.

20 Claims, 5 Drawing Sheets

(56) References Cited

U.S. PATENT DOCUMENTS

| | | | |
|---|---|---|---|
| 2005/0266305 A1 | 12/2005 | Ohata et al. | |
| 2007/0264577 A1* | 11/2007 | Katayama | H01M 2/162 |
| | | | 429/246 |
| 2009/0067119 A1* | 3/2009 | Katayama | H01G 9/02 |
| | | | 361/523 |
| 2010/0015530 A1 | 1/2010 | Katayama et al. | |
| 2012/0189897 A1* | 7/2012 | Wakizaka | H01M 2/145 |
| | | | 429/144 |
| 2013/0309566 A1 | 11/2013 | Umehara | |
| 2014/0322600 A1* | 10/2014 | Morita | H01M 10/4235 |
| | | | 429/212 |
| 2015/0086707 A1* | 3/2015 | Umehara | H01M 2/145 |
| | | | 427/58 |
| 2015/0214529 A1* | 7/2015 | Yawata | H01M 2/162 |
| | | | 429/145 |
| 2017/0084903 A1 | 3/2017 | Umehara | |
| 2018/0138482 A1* | 5/2018 | Sakurai | H01M 4/36 |
| 2018/0315971 A1* | 11/2018 | Kwon | H01M 2/16 |

FOREIGN PATENT DOCUMENTS

| | | | |
|---|---|---|---|
| JP | 11185731 | A | 7/1999 |
| JP | 2012-089346 | A | 5/2012 |
| JP | 2012-199252 | A | 10/2012 |
| JP | 2013-173862 | A | 9/2013 |
| JP | 2013218982 | A | 10/2013 |
| JP | 2014-107035 | A | 6/2014 |
| KR | 1020090102874 | A | 9/2009 |
| KR | 1020140096359 | A | 8/2014 |
| KR | 1020150003313 | A | 1/2015 |
| WO | 2005117169 | A1 | 12/2005 |
| WO | 2012101816 | A1 | 8/2012 |
| WO | 2014106954 | A1 | 7/2014 |

\* cited by examiner

SEPARATOR-INTEGRATED ELECTRODE PLATE AND CAPACITOR ELEMENT

CROSS-REFERENCE TO RELATED APPLICATIONS

This application is based upon and claims the benefit of priority from the prior Japanese Patent Application No. 2016-195915 filed on Oct. 3, 2016, the entire contents of which are incorporated herein by reference.

BACKGROUND

Technical Field

This disclosure relates to a separator-integrated electrode plate including an electrode plate constituted of a current collecting sheet and an active material layer provided thereon, and a separator layer integrally provided on the active material layer, and a capacitor device incorporating the separator-integrated electrode plate.

Related Art

For a capacitor device, such as a primary battery, a secondary battery, and a capacitor, an electrode body is formed in which separators allowing permeation of ions are interposed one between electrode plates arranged facing each other. In this case, there has also been known a separator-integrated electrode plate having a separator integrally formed on at least one of the electrode plates. For example, Japanese Unexamined Patent Application Publication No. 2014-107035 discloses a battery including a separator formed of a separator layer applied on a main surface of a coated electrode plate which is at least one of a positive electrode plate and a negative electrode plate and also discloses a method for manufacturing a battery in which a separator layer (a resin particle layer) is formed by applying insulation paste prepared by dispersing resin particles of thermoplastic resin into a solvent to the main surface of the coated electrode plate and drying the applied resin particles.

SUMMARY

Technical Problems

Meanwhile, for assembling a capacitor device such as a battery and a cell, many electrode plates are laminated or a pair of electrode plates are overlapped and wound together. At that time, foreign substances such as metal powder may enter between the electrode plates. Such metallic foreign substances may be melted once and then deposited and grown in a dendritic shape in a negative electrode. In those cases, the metal powder or the dendrite may penetrate through the separator layer, leading to a short circuit between the electrode plates.

Moreover, in the separator-integrated electrode plate, the separator layer constituted of an electrode plate on which the aforementioned resin particles are applied and dried is apt to be low in resistance to penetration of the foreign substances such as metal powder and dendrite through the separator layer as compared with a separator constituted of a porous film.

The present disclosure has been made to address the above problems and has a purpose to provide a separator-integrated electrode plate including a separator layer having good resistance to penetration of foreign substances while the separator layer includes a resin particle layer provided on an electrode plate, and a capacitor device incorporating the separator-integrated electrode plate.

Means of Solving the Problems

One aspect of the present disclosure provides a separator-integrated electrode plate comprising: a current collecting sheet; an active material layer provided on the current collecting sheet; and a separator layer provided on the active material layer and configured to allow ions contained in electrolyte to permeate through the separator layer, wherein the separator layer is formed of: a polyimide layer provided made of a film of polyimide deposited on the active material layer after the polyimide is melted in a solvent; and a polyolefin particle layer made of polyolefin resin particles accumulated on the polyimide layer, the polyolefin resin particles having a melting point of 140° C. or less.

The aforementioned electrode plate includes the polyolefin particle layer and further the polyimide layer that is high in mechanical strength and is less likely to fracture. Thus, when stacked or laminated on another electrode plate, the separator-integrated electrode plate allows permeation of ions therethrough, but can prevent metal powder that is a foreign substance put on the polyolefin particle layer or dendrite that results from deposited and grown metal from penetrating through the separator layer including the polyimide layer, thus reducing the occurrence of a short circuit between the active material layer of the electrode plate and the another electrode plate.

Further, the polyolefin resin particles have a melting point of 140° C. or less. Therefore, if the battery abnormally generates heat because of a short circuit between the electrodes and other reasons and hence the temperature of the separator layer (the polyolefin particle layer) rises to a high temperature of 140° C. or more, the resin particles melt and fill in current paths, thereby shutting down a flow of current.

Examples of the polyolefin resin particles include resin particles such as polyethylene resin (PE resin), polypropylene resin (PP resin), ethylene-propylene copolymer resin. As the polyolefin resin particles, for example, a single kind of polyethylene resin particles may be used, but there may also be used a mixture of polyethylene resin particles having different melting points, a mixture of polyethylene resin particles and polypropylene resin particles, a mixture of resin particles having different particle diameters or particle shapes, or a core shell structure formed of the resin particles mixed, emulsified and polymerized.

DETAILED DESCRIPTION OF THE EXEMPLARY EMBODIMENTS

First Embodiment

Figure 1:
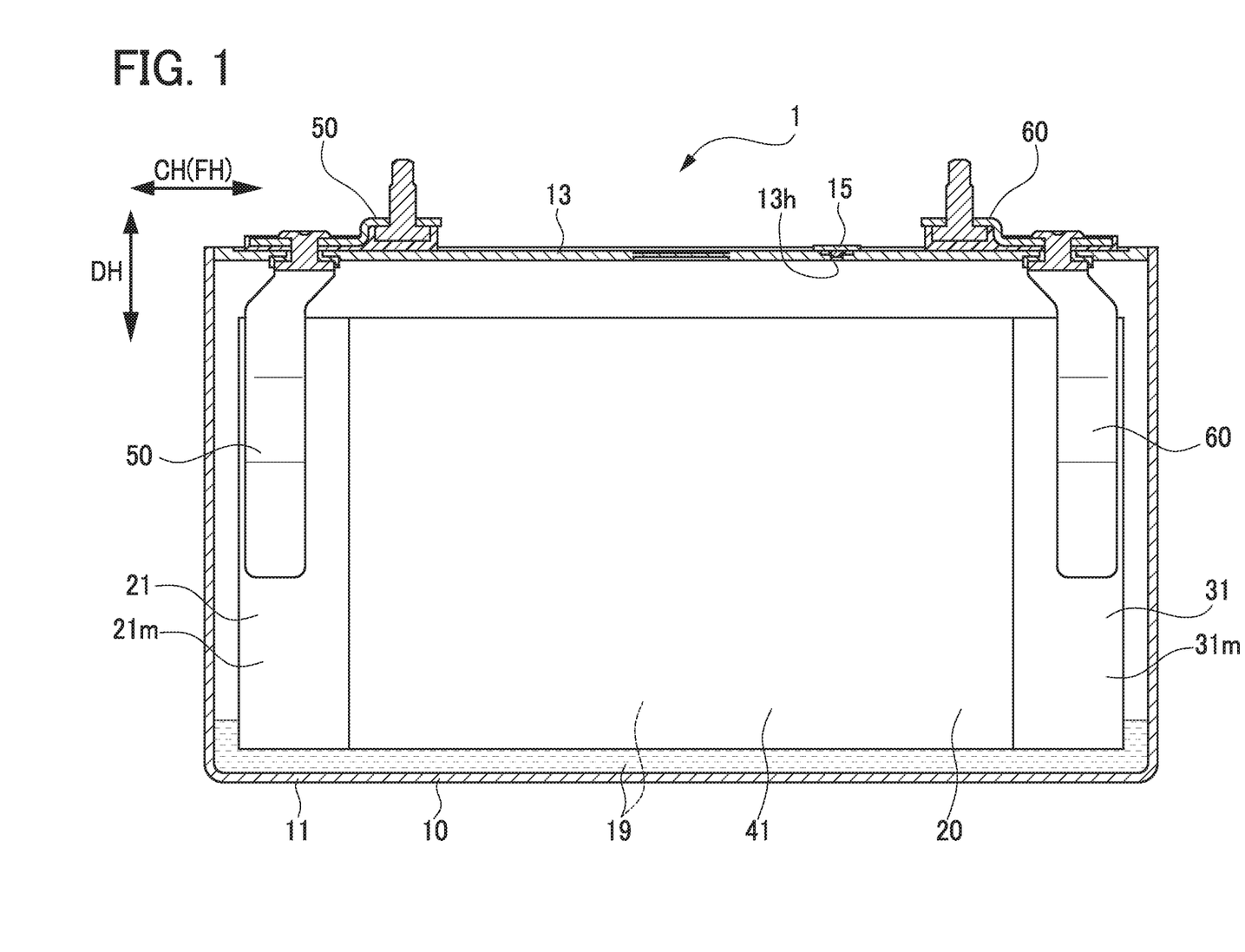
FIG. 1 is a vertical cross sectional view of a lithium ion secondary battery in an embodiment.
Figure 2:
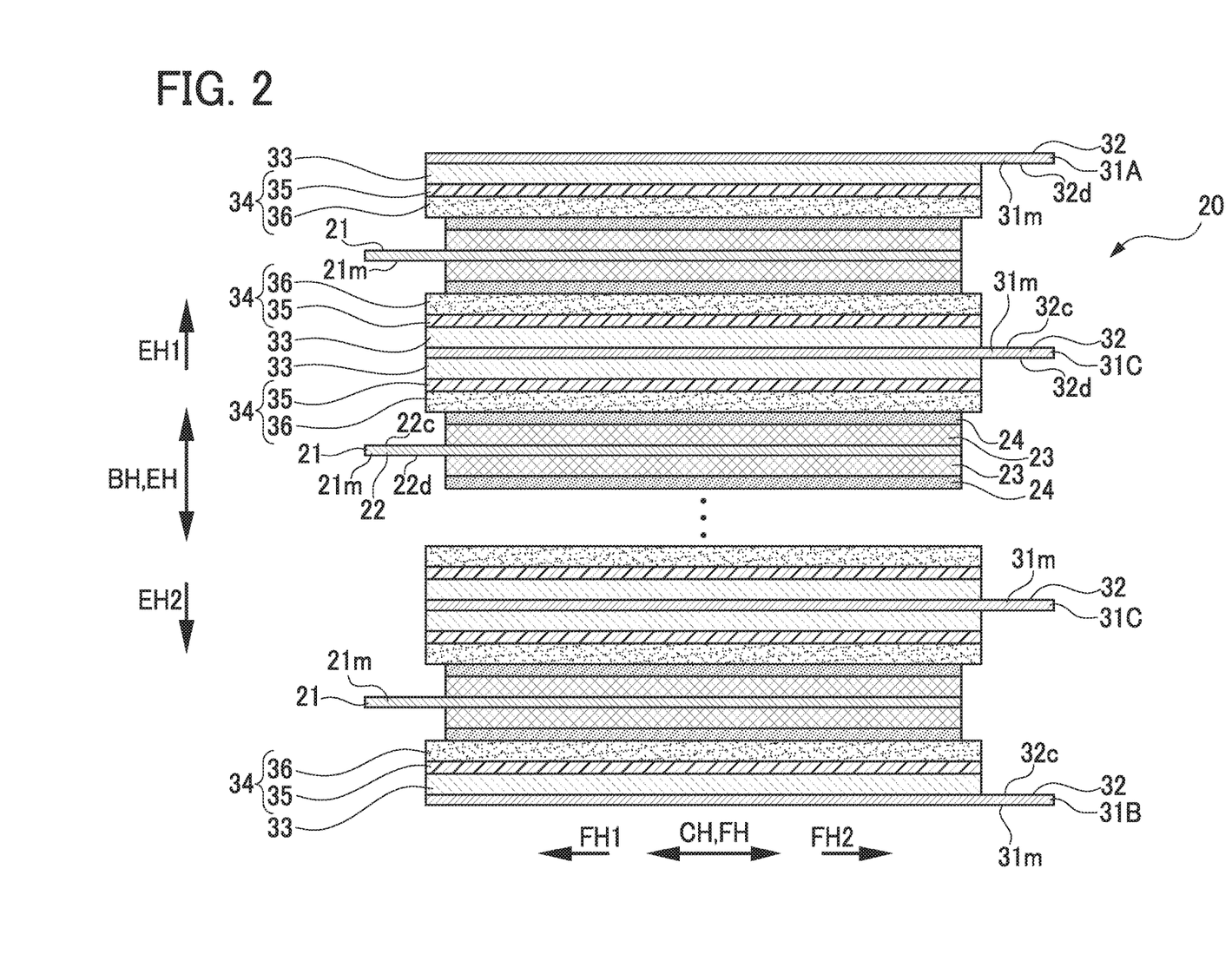
FIG. 2 is an explanatory view showing a lamination state of positive electrode plates and negative electrode plates in an electrode body of the lithium ion secondary battery in the embodiment.
Figure 3:
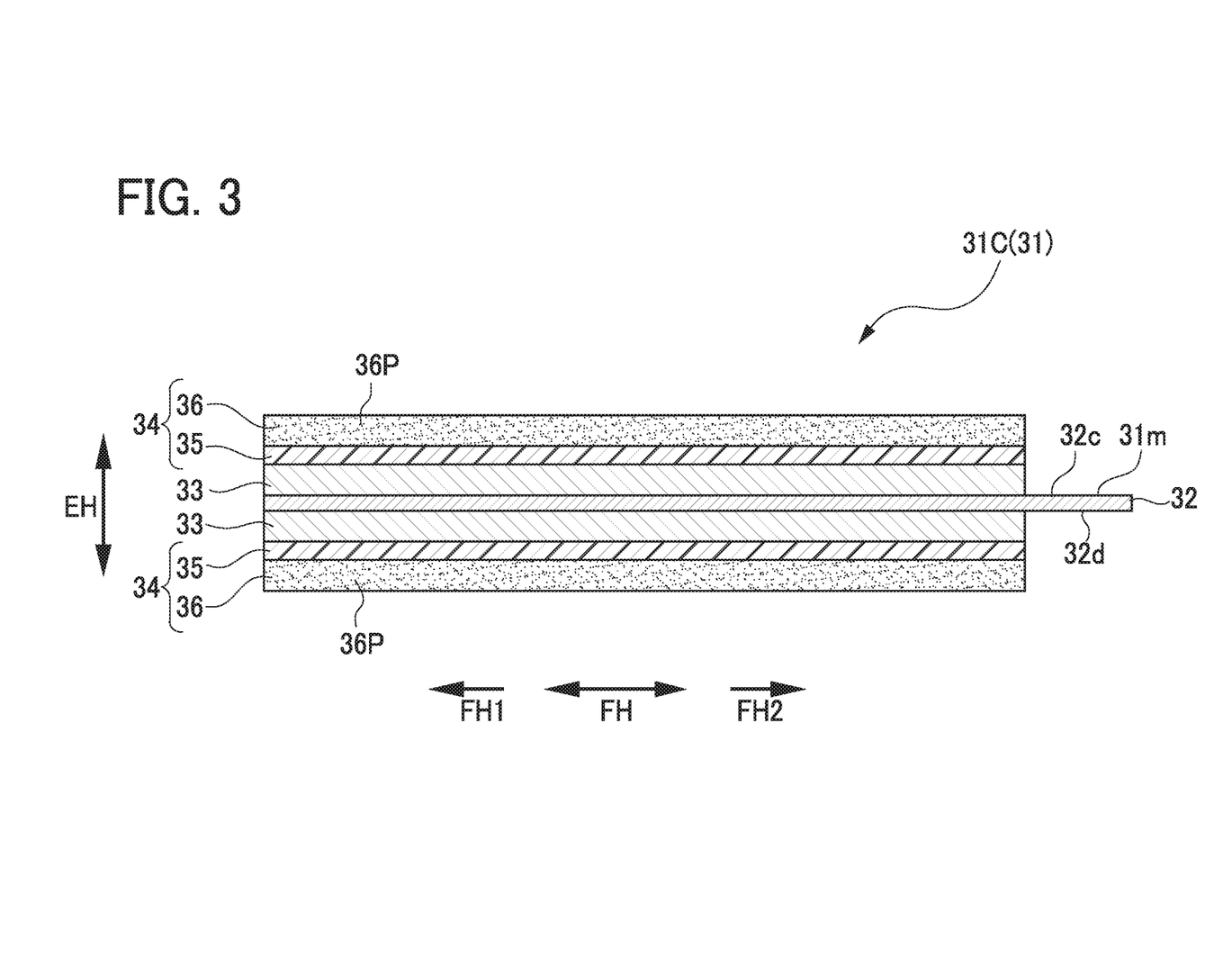
FIG. 3 is a cross sectional view of a separator-integrated negative electrode plate in the embodiment.
Figure 4:
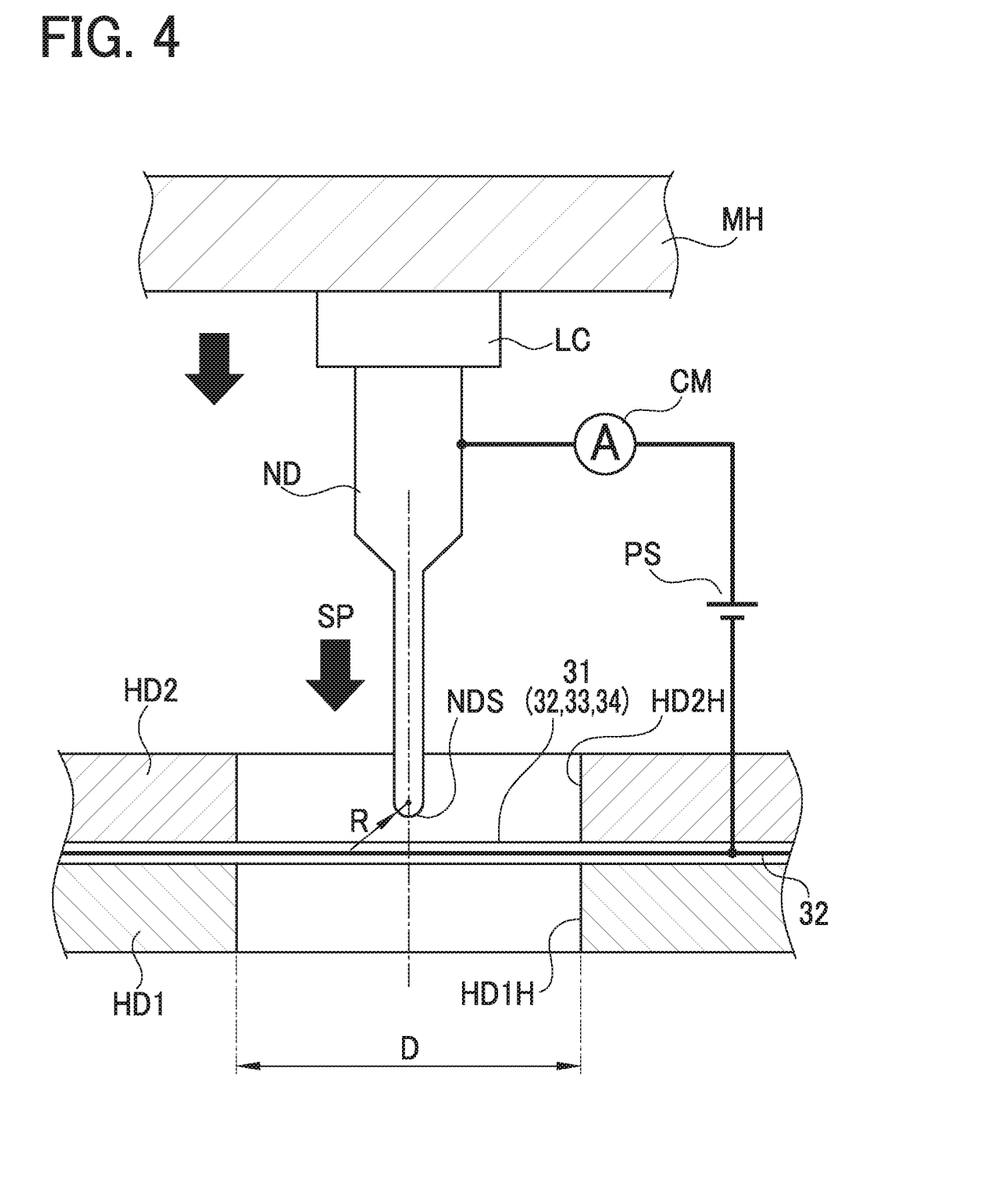
FIG. 4 is an explanatory view to describe a test method of a piercing strength test on the separator-integrated negative electrode plate in the embodiment.

A detailed description of an embodiment of this disclosure will now be given referring to the accompanying drawings. FIG. 1 is a vertical cross sectional view of a lithium ion secondary battery (hereinafter simply referred to as a "battery") in the present embodiment. FIG. 2 illustrates a lamination state of positive electrode plates 21 and negative electrode plates 31 of an electrode body 20 in a battery 1. FIG. 3 is a cross sectional structure of one of the negative electrode plates 31, that is, an inner-side negative electrode plate 31C, in the present embodiment. FIG. 4 is an explanatory view to show a test method of a piercing strength test for measuring the piercing strength of a separator layer 34 of the relevant negative electrode plate 31. The following description is given on the assumption that various directions and sides of the battery 1, i.e., a battery thickness direction BH, a battery lateral direction CH, a battery vertical (height) direction DH, a laminating direction EH, a one side EH1 in the laminating direction (a lamination-direction one side EH1), the other side EH2 in the laminating direction (a lamination-direction other side EH2), a battery extracting direction FH, a first extracting side FH1, and a second extracting side FH2, are defined as indicated by corresponding arrows in FIGS. 1, 2, and 3.

The battery 1 is a rectangular, sealed, lithium ion secondary battery which will be mounted in a vehicle such as a hybrid vehicle, a plug-in hybrid vehicle, and an electric vehicle. The battery 1 includes a battery case 10, a laminated electrode body 20 accommodated in the battery case 10, a positive electrode terminal member 50 and a negative electrode terminal member 60 each supported in the battery case 10, and others (see FIG. 1). In the battery case 10, a non-aqueous electrolyte (an electrolytic solution) 19 is contained, a part of which is impregnated in the electrode body 20.

The battery case 10 is made of metal (aluminum in the present embodiment) in a rectangular parallelepiped box-like shape. This battery case 10 is constituted of a case body member 11 having a rectangular tubular shape with a closed bottom and an open upper end, and a case lid member 13 having a rectangular plate-like shape welded to the case body member 11 to close the open end thereof. In the case lid member 13, a positive electrode terminal member 50 made of aluminum is fixedly provided in an insulated manner from the case lid member 13. This positive electrode terminal member 50 is electrically connected, at its one end, to a positive current collecting portion 21m of the positive electrode plate 21 of the laminated electrode body 20 in the battery case 10, while the other end of the terminal member 50 extends to battery outside through the case lid member 13. In the case lid member 13, a negative electrode terminal member 60 made of copper is fixedly provided in an insulated manner from the case lid member 13. This negative electrode terminal member 60 is electrically connected, at its one end, to a negative current collecting portion 31m of the negative electrode plate 31 of the electrode body 20 in the battery case 10, and the other end of the terminal member 60 extends to battery outside through the case lid member 13.

The electrode body 20 (also see FIG. 2) has a nearly rectangular parallelepiped shape and is accommodated in the battery case 10 in an orientation that the laminating direction EH of the positive electrode plates 21 and the negative electrode plates 31 corresponds to the battery thickness direction BH and the electrode extracting direction FH corresponds to the battery lateral direction CH. In the laminating direction EH, in FIG. 2, an upper side is assumed as a one side EH1 and a lower side is assumed as an other side EH2. Further, in the electrode extracting direction FH, in FIG. 2, a left side is assumed as a first extracting side FH1 and a right side is assumed as a second extracting side FH2.

This electrode body 20 is consisted of a plurality of rectangular positive electrode plates 21 and a plurality of rectangular negative electrode plates 31, which are alternately laminated in the laminating direction. Each of the positive electrode plates 21 includes rectangular positive active material layers 23 one on a part of each surface (a one-side surface 22c and an other-side surface 22d) of a positive current collecting foil 22 made of a rectangular aluminum foil, the part being located close to the second extracting side FH2 (a right side in FIG. 2) in the electrode extracting direction FH. In addition, heat-resistant material layers 24 are provided one on each of the positive active material layers 23. Of the positive current collecting foil 22 of each positive electrode plate 21, a part located close to the first extracting side FH1 (a left side in FIG. 2) forms a positive current collecting portion 21m in which the positive active material layers 23 and the heat-resistant material layers 24 are not present and thus the positive current collecting foil 22 is exposed. The positive current collecting portions 21m of the positive electrode plates 21 are bound together in the laminating direction EH and welded to the aforementioned positive electrode terminal member 50.

The positive current collecting foil 22 used for each positive electrode plate 21 is a rolled aluminum foil having a thickness of 6 μm to 20 μm (concretely, 15 μm in the present embodiment). Each positive active material layer 23 has a thickness of for example 10 μm to 90 μm (concretely, 68 μm in the present embodiment). Examples of the positive active material for the lithium ion secondary battery include materials that can absorb and release $Li^+$ ions; for example, $LiCoO_2$, $LiMnO_4$, $LiNi_xMn_yCo_zO_2$, $LiNi_xCo_yAl_zO_2$, $LiFePO_4$. In the present embodiment, each positive active material layer 23 additionally contains acetylene black serving as a conductive material and PVDF serving as a binder as well as $LiNi_{1/3}Mn_{1/3}Co_{1/3}O_2$. Further, each heat-resistant material layer 24 has a thickness of for example 2 μm to 8 μm (concretely, 5 μm in the present embodiment). Examples of the heat-resistant material used for the heat-resistant material layer 24 include particles that resist heat and electrolyte, for example, aluminum particles, boehmite particles, titania particles, and silica particles. In the present embodiment, aluminum particles with a median particle size (D50%) of 1 μm are applied and dried together with CMC (carboxymethyl cellulose) as a binder.

Next, the negative electrode plates 31 corresponding to the separator-integrated electrode plate in the present embodiment will be described below. The negative electrode plates 31, stacked together with the positive electrode plates 21 which are alternately arranged, are classified into a one-side negative electrode plate 31A located outermost on the one side EH1 in the laminating direction EH (i.e., at an uppermost end in FIG. 2), an other-side negative electrode plate 31B located outermost on the other side EH2 in the laminating direction EH (i.e., at a lowermost end in FIG. 2), and inner-side negative electrode plates 31C interposed between them.

Each of the inner-side negative electrode plates 31C shown in FIG. 3 is provided with a rectangular negative current collecting foil 32, and rectangular negative active material layers 33 one on a part, located close to the first extracting side FH1 (the left side in FIGS. 3 and 2), of each surface of the negative current collecting foil 32. In addition, on each of the negative active material layers 33 (the laminating-direction one side EH1 and the laminating-direction other side EH 2), separator layers 34 are provided integral with the corresponding negative active material layer 33. In contrast, the one-side negative electrode plate 31A of the negative electrode plates 31 is provided with the negative active material layer 33 and the separator layer 34 only on an other-side surface 32d of the negative current collecting foil 32, while the other-side negative electrode plate 31B is provided with the negative active material layer 33 and the separator layer 34 only on a one-side surface 32c of the negative current collecting foil 32. It is to be noted that a part of the negative current collecting foil 32 of each negative electrode plate 31, the part being located close to the second extracting side FH2 (the right side in FIG. 3), forms a negative current collecting portion 31m in which the negative active material layers 33 and the separator layers 34 are not present and thus the negative current collecting foil 32 is exposed. The negative current collecting portions 31m of the negative electrode plates 31 are bound together in the laminating direction EH and welded to the aforementioned negative electrode terminal member 60.

The negative current collecting foil 32 used for each negative electrode plate 31 is a copper foil having a thickness of 6 μm to 15 μm (concretely, 10 μm in the present embodiment). Each negative active material layer 33 has a thickness of for example 10 μm to 80 μm (concretely, 62 μm in the present embodiment). Examples of the negative active material for the lithium ion secondary battery include materials that can absorb and release $Li^+$ ions; for example, graphite particles such as natural graphite and artificial graphite, hard carbon, soft carbon, $Li_4Ti_5O_{12}$, $Li_{4.4}Si$, and $Li_{4.4}Ge$. In the present embodiment, the negative active material layers 33 each contain acetylene black as a conductive material and CMC as a binder as well as natural graphite. The separator layers 34 are each constituted of a polyimide layer 35 located on a side close to the corresponding negative active material layer 33 and a particle layer 36 formed on the polyimide layer 35. This polyimide layer 35 has a thickness for example falling within a range of 0.2 μm to 15 μm (concretely, 5.0 μm in the present embodiment) and is a film-like layer made of polyimide resin melted once in a solvent and then applied on the negative active material layer 33 and dried and deposited thereon. Each particle layer 36 has a thickness for example falling within a range of 10 μm to 25 μm (concretely, 15.0 μm in the present embodiment) and is constituted of resin particles 36P made of polyolefin, specifically, accumulated PE particles 36P made of polyethylene having a melting point of 132° C. The PE particles are spherical particles having a median particle size (D50%) of 3 μm.

Each separator layer 34 (the polyimide layer 35 and the particle layer 36) functions as a separator that allows ions such as $Li^+$ ions in the electrolyte to pass through when a capacitor device, e.g., an Li ion secondary battery, is constituted of the negative electrode plates 31. As a result of measurement, the air-permeation resistance degree which is an index to measure the ion permeation in the separator layer 34 in the present embodiment was 45 sec/100 ml.

The separator layers 34 (the polyimide layers 35 and the particle layers 36) provided in the negative electrode plates 31 could not be directly subjected to measurement of the air-permeation resistance degree. Therefore, separately, a polyimide paste prepared by melting polyimide resin in a solvent is applied and dried on an aluminum mesh, and further a microparticulate aqueous dispersion containing PE particles dispersed is gravure-applied and dried to form a separator layer for measurement. This separator layer for measurement was subjected to measurement of the air-permeation resistance degree by use of a Gurley tester (Gurley Densometer manufactured by Toyo Seiki Seisakusho Co., Ltd.) defined in JIS P 8117:2009.

As a result of measurement, the piercing strength of the separator layer 34 of the negative electrode plate 31 was 114 mN(=11.6 gf). The method for measuring the piercing strength of the separator layer 34 was performed in the following manner (see FIG. 4). Specifically, the negative electrode plate 31 is sandwiched in a flat tensed state between retainers HD1 and HD2 respectively formed with through holes HD1H and HD2H each having a diameter D of 40 mm. A moving head MH movable downward in FIG. 4 is attached with a press needle ND through a load cell LC. A tip NDS of this press needle ND has a semi-spherical shape having a radius R of 150 μm. This tip NDS of the press needle ND is moved in a direction perpendicular to the negative electrode plate 31 (i.e., from above in FIG. 4) toward the center of the through holes HD1H and HD2H at a moving speed SP of 0.1 mm/minute. A load applied when the tip NDS of the press needle ND pierces through the separator layer 34 and comes into contact with the negative active material layer 33 of the negative electrode plate 31 is measured by use of the load cell LC. Contacting of the tip NDS of the press needle ND with the negative active material layer 33 of the negative electrode plate 31 is determined in such a way that a power source PS and an ammeter CM are connected between the negative current collecting foil 32 of the negative electrode plate 31 and the press needle ND as shown in FIG. 4 and a point in time when a current passes through the ammeter CM is detected as a point in time when the tip NDS of the press needle ND contacts the negative active material layer 33 of the negative electrode plate 31.

To evaluate the ion permeability and the insulation property of the separator layer 34 of the negative electrode plate 31 in the present embodiment by using an actual electrode system, there are prepared the one-side negative electrode plate 31A provided with the negative active material layer 33 and the separator layer 34 on only the one side of the negative current collecting foil 32 and an other-side positive electrode plate (not shown) provided, differently from the aforementioned positive electrode plate 21, with the positive active material layer 23 and the heat-resistant layer 24 on only an other side of the positive current collecting foil 22. This pair of the negative active material layer 33 and the positive active material layer 23 are assembled so as to face each other by interposing therebetween the separator layer 34. This assembly is wrapped with a laminate material and impregnated with electrolyte to form a laminate cell.

This laminate cell is subjected to a charge-discharge test. Specifically, the laminate cell is subjected to initial charge and thereafter adjusted to SOC 50%, and discharged at 1C, 2C, and 5C each for 10 seconds. Then, the IV resistance value (mΩ) of this laminate cell is measured based on a drop amount ΔV1 of battery voltage and a discharge current (mA) during discharge. This IV resistance value of the laminate cell was 6.8 me.

The above-mentioned laminate cell is fully charged at initial charge and then left to stand (without applying any load) for a period of seven days. Then, a voltage drop amount ΔV2 (mV) of this laminate cell due to self-discharge is measured based on a battery voltage measured before and after the standing period. This voltage drop amount ΔV2 of this laminate cell was 6.3 mV.

Examples and Comparative Examples

In each of Examples 1 to 8, a negative electrode plate 31 including a separator layer 34 having the same total thickness (20 μm) as that of the separator layer 34 of the negative electrode plate 31 in the present embodiment, but a polyimide layer 35 and a particle layer 36 have different thicknesses from those of the negative electrode plate 31 in the present embodiment was subjected or a laminate cell using this negative electrode plate 31 was subjected to measurement of air-permeation resistance degree, piercing strength, IV resistance value, and amount of voltage drop by self-discharge by the aforementioned method. To be concrete, in Examples 1 to 8, the thickness of each separator layer 34 is uniformly set to 20 μm and the thickness of each polyimide layer 35 is variously set to 0.2 μm, 0.5 μm, 1.5 μm, 3.0 μm, 5.0 μm, 6.0 μm, 8.0 μm, and 13.0 μm. The negative electrode plate 31 in the aforementioned embodiment corresponds to the negative electrode plate in Example 5.

In addition, as Comparative Example 1, a negative electrode plate in which the polyimide layer 35 is not formed and thus a separator layer 34 is entirely formed of a particle layer 36 is evaluated in a similar way to the above. Furthermore, as Comparative Example 2, a negative electrode plate including an independent separator, not the separator layer 34 integral with the negative active material layer 33, is also evaluated similarly. For the independent separator in Comparative Example 2, a separator (UBE Industries, Ltd.) having a four-layer structure in which a porous film having a three-layer structure, PP/PE/PP, additionally includes a heat-resistant layer provided on one surface of the film. This separator in Comparative Example 2 has been used as a separator for a lithium ion secondary battery. The characteristics of this separator and a battery using the same can be used as one criterion for determining the quality of the characteristics of the separator layers 34 of the negative electrode plates 31 in each example. Results of each Example and Comparative Examples are shown in Table 1. In each example, three samples were evaluated.

the separator was 260 sec/100 ml. In contrast, in Comparative Example 1 in which the separator layer of the negative electrode plate has no polyimide layer 35 and is entirely made of the particle layer 36, the separator layer exhibits an air-permeation resistance degree of 11 sec/100 ml. This result reveals that Comparative Example 1 provides good air-permeability. It is conceivable that this good air-permeability is obtained by the presence of many voids or gaps between accumulated PE particles forming the particle layer 36. In the negative electrode plates 31 in Examples 1 to 8, in contrast, it is revealed that as the polyimide layer 35 is thicker (i.e., the particle layer 36 is thinner), the air-permeation resistance degree is higher, that is, the air-permeability of the separator layer 34 is lower. This is because the polyimide layer 35 formed in such a way that polyimide resin having been melted once in a solvent is applied, dried, and deposited on the negative active material layer 33 is inferior in air-permeability to the particle layer 36 made of accumulated PE particles. In particular, in Example 8 in which the thickness of the polyimide layer 35 is set to 13.0 μm, the air-permeation resistance degree was 265 sec/100 ml, which is lower than that of the separator in Comparative Example 2. However, even this separator layer 34 in Example 8 can obtain the air-permeation resistance degree nearly equal to that the separator of Comparative Example 2. In a thickness range of at least 13 μm or less, further, even in a thickness range more than 13 μm, the polyimide layers 35 exhibits the permeability that allows ions in electrolyte to pass through each polyimide layer 35 according to the thickness thereof. These polyimide layers 35 can be used as part of the separator layers 34. When the thickness of the polyimide layer is more than 6 μm, the air-permeation resistance degree is sharply higher. Since polyimide resin covers almost all the entire surface of the negative active material layer, the thickness of the polyimide layer more than 6 μm likely results in higher air-permeation resistance.

A second study is made on the piercing strength of the separator layers 34 of the negative electrode plates 31 in each of Examples and Comparative Examples. The piercing strength of the separator in Comparative Example 2 was 64 mN(=6.5 gf). However, this piercing strength of the sepa-

TABLE 1

| | Separator Layer | | Air-permeation resistance degree (sec/100 ml) | Piercing Strength (mN (gf)) | IV Resistance Value (mΩ) | Voltage Drop Amount by Self-discharge (mV) |
|---|---|---|---|---|---|---|
| | Polyimide Layer Thickness (μm) | Particle Layer Thickness (μm) | | | | |
| CEX 1 | — | 20.0 | 11 | 33 (3.4) | 2.5 | Short |
| EX 1 | 0.2 | 19.8 | 13 | 50 (5.1) | 2.5 | 18.7 |
| EX 2 | 0.5 | 19.5 | 16 | 64 (6.5) | 3 | 12.0 |
| EX 3 | 1.5 | 18.5 | 20 | 95 (9.7) | 4.5 | 8.1 |
| EX 4 | 3.0 | 17.0 | 40 | 112 (11.4) | 5.2 | 6.7 |
| EX 5 | 5.0 | 15.0 | 45 | 114 (11.6) | 6.8 | 6.3 |
| EX 6 | 6.0 | 14.0 | 50 | 123 (12.5) | 7.2 | 6.4 |
| EX 7 | 8.0 | 12.0 | 160 | 167 (17.0) | 8.3 | 4.9 |
| EX 8 | 13.0 | 7.0 | 265 | 210 (21.4) | 9.5 | 5.4 |
| CEX 2 | Heat Resistance-Layer/ PP/PE/PP: 24.0 | — | 260 | 64 (6.5) | 7.2 | 13.4 |

EX: Example,
CEX: Comparative Example

A first study is made on the air-permeation resistance degree of the separator layers 34 of the negative electrode plates 31 in Examples and Comparative Examples. In Comparative Example 2, the air-permeation resistance degree of rator in Comparative Example 2 is measured in such a way that only this separator is retained between the aforementioned retainers HD1 and HD2 (see FIG. 4). In contrast, in Comparative Example 1 in which the separator layer 34 is made of only the particle layer 36, the piercing strength was 33 mN, which is lower than that in Comparative Example 2. This seems because the particle layer 36 made of accumulated PE particles allows each PE particle to easily move and thus is low in resistance to piercing of the press needle ND. In the negative electrode plates 31 in Examples 1 to 8, in contrast, as the thickness of the polyimide layer 35 is thicker, the piercing strength is higher. The piercing strength in Example 2 having the polyimide layer 35 of a 0.5-μm thickness was 64 mN, which is equal to that in Comparative Example 2. In Examples 3 to 8 each having the polyimide layer 35 with a larger thickness than that in Example 2 could achieve higher piercing strength. Since polyimide resin forming the polyimide layer 35 has a rigid and strong molecular structure and in addition has an intermolecular attractive force with strong imide bond, the polyimide layer 35 could be less likely to cause film damage and enhance the piercing strength with respect to piercing of the tip NDS of the press needle ND.

A next study is made on the IV resistance value of laminate cells individually incorporating the negative electrode plates in Examples and Comparative Examples in addition to the aforementioned positive electrode plate. The IV resistance value of the laminate cell using the separator in Comparative Example 2 was 7.2 mΩ. In contrast, the IV resistance value of the laminate cell in Comparative Example 1 was 2.5 mΩ, which is about ⅓ of the IV resistance value in Comparative Example 2. As is found from that the air-permeation resistance degree in Comparative Example 1 is a lower value, the particle layer 36 made of accumulated PE particles is formed with many voids between the PE particles and thus is good in air-permeability, which allows ions (Li ions in each example) in the electrolyte to easily pass through the particle layer 36, resulting in a low IV resistance value. In the laminate cells incorporating the negative electrode plates 31 in Examples 1 to 8, in contrast, as the polyimide layer 35 is thicker, the IV resistance value is higher. In particular, the IV resistance value of the laminate cell in Example 6 with the polyimide layer 35 of a 6.0-μm thickness was 7.2 mΩ, which is equal to that using the separator in Comparative Example 2. The IV resistance value in each of the laminate cells in Examples 7 and 8 is higher than that in the laminate cell using the separator in Comparative Example 2. This seems because the thickness of the polyimide layer 35 in the separator layer 34 is too larger, causing a decrease in permeability of Li ions in the electrolyte through the separator layer 34, resulting in an increase in IV resistance value.

Next, a study is made on an amount of voltage drop due to self-discharge of laminate cells individually incorporating the negative electrode plates in Examples and Comparative Examples and the aforementioned positive electrode plate. The voltage drop amount of the laminate cell using the separator in Comparative Example 2 was 13.4 mV. In contrast, the laminate cell in Comparative Example 1 with the separator layer 34 constituted of only the particle layer 36 caused a short circuit due to foreign substances and hence could not be measured. In this negative electrode plate in Comparative Example 1, as found from its low piercing strength, interposed metal powder or grown dendrite are likely to pierce through the separator layer 34, which leads to a short circuit between the positive electrode plate 21 and the negative active material layer 33 of the negative electrode plate 31 during the standing period after initial charge. In contrast, in the laminate cells in Examples 1 to 8 in each of which the separator layer 34 includes the polyimide layer 35, such a short circuit as in Comparative Example 1 did not occur. This seems because the presence of the polyimide layer 35 prevents interposed metal powder or the like from piercing through the separator layer 34 (the polyimide layer 35) and thus prevents a short circuit from occurring between the positive electrode plate 21 and the negative active material layer 33 of the negative electrode plate 31. In Examples 1 to 8, the laminate cells in Examples 1 to 5 each including the polyimide layer 35 with a thickness of 0.5 μm to 5.0 μm, as the polyimide layer 35 is thicker, the voltage drop amount is lower. This seems because the thicker polyimide layer 35 can prevent a micro short circuit between positive and negative electrodes. However, in Examples 5 to 8 (each polyimide layer 35 with a thickness of 5.0 μm to 13.0 μm), it is found that the voltage drop amounts are nearly equal to each other without intercorrelating with the thickness of the polyimide layer 35. This is considered to result from that when the thickness of the polyimide layer 35 is equal to or larger than 5.0 μm (Example 5), a decreasing action of the voltage drop amount by an increase in thickness of the polyimide layer reaches an upper limit.

Those results reveal that, in any of the negative electrode plates 31 in Examples 1 to 8 including the separator layers 34 provided with the polyimide layers 35, each separator layer 34 (each polyimide layer 35) allows Li ions in the electrolyte to permeate therethrough and can function as a separator. Accordingly, the negative electrode plates 31 in Examples 1 to 8 can be used as a separator-integrated negative electrode plate.

In addition, the presence of the polyimide layer 35 can prevent metal powder put on the particle layer 36, dendrite resulting from deposited metal on the particle layer 36, and others from piercing through the separator layer 34 and thus can prevent a short circuit from occurring between the negative active material layer 33 and the positive electrode plate 21 placed on the separator layer 34.

Furthermore, the resin particles 36P used in the particle layer 36 of the negative electrode plate 31 in each of the present embodiment and Examples has a melting point equal to or lower than 140° C., concretely, 132° C. Therefore, if the battery 1 abnormally generates heat because of a short circuit between a positive electrode and a negative electrode of the battery 1 and thus the temperature of the separator layer 34 (the particle layer 36) rises to a high temperature of 140° C. or more, the resin particles 36P melt and fill in paths of electric current. This can shut down a current flowing through the battery 1.

Moreover, the negative electrode plate 31 (the polyimide layer 35 having a thickness of 13.0 μm) in Example 8 is inferior in air-permeation resistance degree to that of the separator in Comparative Example 2. However, the negative electrode plate 31 (the polyimide layer 35 having a thickness of 8.0 μm) in Example 7 is more excellent in air-permeation resistance degree than that of the separator in Comparative Example 2. This result reveals that, when the polyimide layer 35 of the negative electrode plate 31 has a thickness of 10.0 μm or less, the negative electrode plate 31 can be produced with a more excellent air-permeation resistance degree than the separator in Comparative Example 2.

Further, the negative electrode plate 31 (the polyimide layer 35 having a thickness of 8.0 μm or 13.0 μm) in Example 7 or 8 is higher in air-permeation resistance degree (lower in air-permeability) than that in other examples and also inferior in IV resistance value to 7.2 mΩ in Comparative Example 2. In contrast, the negative electrode plates 31 (the polyimide layer 35 having a thickness of 0.2 μm to 6.0 μm) in Examples 1 to 6 are equal or higher in air-permeation resistance degree and IV resistance value to or than those in Comparative Example 2. From this, when the polyimide layer 35 of the negative electrode plate 31 has a thickness of 6.0 μm or less, the negative electrode plate 31 and the battery can be produced with the IV resistance value equal to or less than that of the separator in Comparative Example 2.

Furthermore, the negative electrode plate 31 (the polyimide layer 35 having a thickness of 0 μm) in Comparative Example 1 and the negative electrode plate 31 (the polyimide layer 35 having a thickness of 0.2 μm) Example 1 are low in piercing strength (33 mN and 50 mN), inferior to the piercing strength (64 mN) of the separator in Comparative Example 2. In contrast, the negative electrode plates 31 (the polyimide layers 35 having a thickness of 0.5 μm to 13.0 μm) in Examples 2 to 8 are equal or higher in piercing strength to or than that in Comparative Example 2. From this, when the polyimide layer 35 of the negative electrode plate 31 has a thickness of 0.5 μm or more, the negative electrode plate 31 can be produced with the piercing strength equal to or higher than that of the separator in Comparative Example 2.

Each of the negative electrode plates 31 in Examples 1 to 7 is provided with the particle layer 36 having a thickness of 19.8 μm to 12.0 μm. When the thickness of the particle layer 36 is thinner than 10 μm, if the battery abnormally generates heat, resin particles 36P made of polyolefin (polyethylene) in the particle layer 36 melt, but may fill in voids with poor reliability. In contrast, even when the thickness of the particle layer 36 is set to more than 25 μm, the shutdown function of the separator layer could not be improved and rather various defects may be caused by the increased thickness; for example, size increase and cost rise of a battery. In contrast, since the thickness of the particle layer 36 is set within a range of 10 μm to 25 μm, if the battery 1 abnormally generates heat, the resin particles 36P of the particle layer 36 melt and fill in voids, thereby enabling reliably shutting down a current flowing through the battery. Meanwhile, the size increase and the cost rise of the negative electrode plates and the battery can be prevented.

Figure 5:
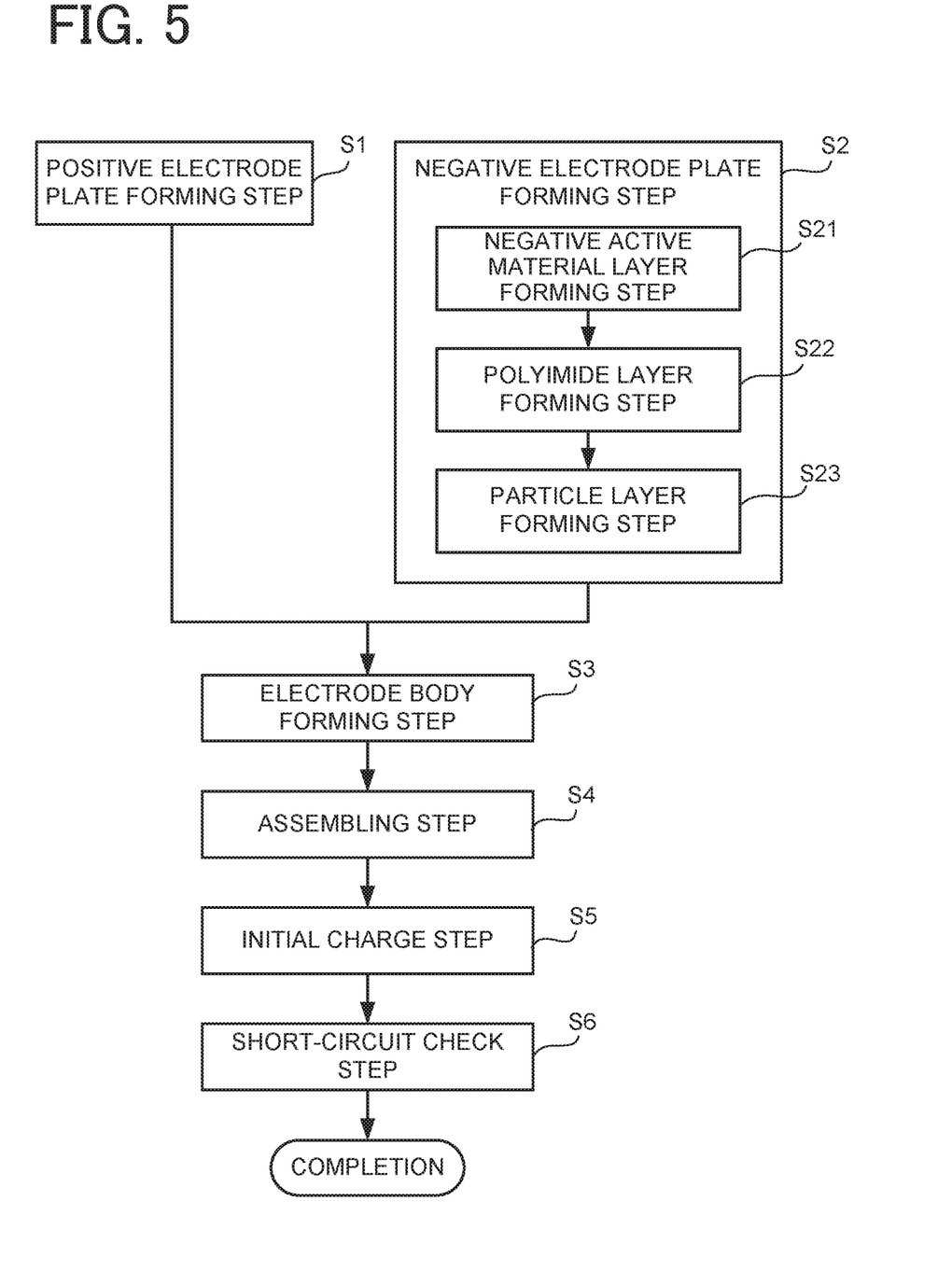
FIG. 5 is a flowchart showing a method for producing a negative electrode plate and a method for manufacturing a battery in the embodiment.

Next, a method for manufacturing the negative electrode plates 31 and the battery 1 will be described with reference to FIG. 5. In a positive electrode plate forming step S1, firstly, a plurality of positive electrode plates 21 are produced. Specifically, the aforementioned positive electrode active material, conductive material, and binder are kneaded together with a solvent (NMP) to produce a positive electrode paste. Further, this positive electrode paste is applied to the one-side surface 22c of the positive current collecting foil 22 by a die-coating method, and heated and dried to form a positive active material layer 23. The positive electrode paste is also applied to the other-side surface 22d of the positive current collecting foil 22 and heated and dried to form a positive active material layer 23. Thereafter, on each of the positive active material layers 23, a heat-resistant material paste prepared by dispersing aluminum particles and a binder in a solvent is applied and dried to form a heat-resistant layer 24. Then, this positive electrode plate 21 is compressed by a pressure roll to increase the density of each positive active material layer 23. In this way, the positive electrode plate 21 is formed.

Separately, in a negative electrode plate forming step S2, a plurality of negative electrode plates 31 are formed. Specifically, in a negative active material layer forming step S21, the aforementioned negative active material, conductive material, and binder are kneaded together with a solvent, that is, water, to prepare a negative electrode paste. For the inner-side negative electrode plate 31C, a step of applying and drying of the negative electrode paste onto the negative current collecting foil 32 by the die-coating method is repeated to form negative active material layers 33 one on each surface of the negative current collecting foil 32. For the one-side negative electrode plate 31A, the aforementioned negative paste is applied and dried onto the other-side surface 32d of the negative current collecting foil 32 to form the negative active material layer 33. Further, for the other-side negative electrode plate 31B, the negative electrode paste is applied and dried onto the one-side surface 32c of the negative current collecting foil 32 to form the negative active material layer 33. Each of the negative electrode plates 31 (31A to 31C) is compressed by a pressure roll to increase the density of each negative active material layer 33.

In a polyimide layer forming step S22, successively, a polyimide layer 35 is formed on each of the negative active material layers 33. Specifically, a polyimide paste is prepared by dissolving polyimide resin in a solvent and then applied and dried onto each negative active material layer 33 to deposit the polyimide resin thereon. Thus, a film-like polyimide layer 35 made of polyimide resin is formed on each negative active material layer 33.

In a particle layer forming step S23, additionally, the particle layer 36 is formed on each polyimide layer 35. Specifically, microparticulate aqueous dispersion (CHEMIPEARL™ produced by Mitsui Chemicals, Inc.) consisting primarily of polyethylene emulsion containing PE particles dispersed therein is applied and dried on the polyimide layer 35 by a reverse micro-gravure coating method to form the particle layer 36 consisting of accumulated PE particles on the polyimide layer 35. A median particle size (D50%) of the PE particles is 3 μm. Thus, the negative electrode plates 31 (31A, 31B, and 31C) are formed.

In an electrode body forming step S3, the electrode body 20 is assembled. To be concrete, the plurality of positive electrode plates 21 and negative electrode plates 31 are alternately stacked on one another. At this time, the one-side negative electrode plate 31A is placed on one side EH1 in the laminating direction EH (i.e., at the an uppermost end position in FIG. 2), while the other-side negative electrode plate 31B is placed on the other side EH2 in the laminating direction EH (i.e., at the lowermost end position in FIG. 2).

In an assembling step S4, the battery 1 is assembled up. To be concretely, the positive electrode terminal member 50 and the negative electrode terminal member 60 are fixedly provided in the case lid member 13 (see FIG. 1). In addition, those terminal members 50 and 60 are each welded to the electrode body 20. Then, this electrode body 20 is inserted in the case body member 11 and the open end of the case body member 11 is closed by the case lid member 13. The case body member 11 and the case lid member 13 are welded to each other by laser, thereby forming the battery case 10. Thereafter, the non-aqueous electrolyte 19 is poured in the battery case 10 through a liquid inlet 13h formed in the case lid member 13, so that the non-aqueous electrolyte 19 is impregnated in the electrode body 20. Then, the liquid inlet 13h is sealed with a closing member 15.

Prior to an initial charge step S5, the battery 1 is placed under restraint. To be concrete, the battery 1 is clamped under pressure in a battery thickness direction BH between a pair of plate-shaped pressure jigs pressing in the battery thickness direction BH against two opposite side surfaces of the battery case 10, each of which surfaces extends perpendicular to the battery thickness direction BH and has a largest area among the side surfaces of the battery case 10. In the present embodiment, the battery 1 in such a restrained state is subjected to the initial charge step S5 and a short-circuit check step S6 which will be described later.

While the battery 1 is held under restraint as above, this battery 1 is subjected to initial charge. To be specific, the battery 1 is connected to a charge-discharge device and applied with initial charge to 4.2 V at a room temperature (25±5° C.) by constant-current constant-voltage charge (CCCV charge).

In the short-circuit check step S6, the battery 1 is left to stand at high temperature to cause aging, and then further allowed to stand at room temperature for a predetermined period of time. Thus, a voltage drop amount ΔV2 due to self-discharge is calculated from battery voltages before and after the standing period to detect whether or not an internal short circuit has occurred in the battery 1. Specifically, the battery 1 having been subjected to the initial charge is put at a temperature of 50° C. to 80° C. (60° C. in the present embodiment) and left to stand with the terminals left open for 20 hours to cause aging. Subsequently, the battery 1 is allowed to stand for seven days at room temperature (25±5° C.) and then the voltage drop amount ΔV2 is measured.

Thereafter, whether or not a short circuit has occurred in the relevant battery 1 is determined based on the magnitude of the voltage drop amount ΔV2. To be specific, the voltage drop amount ΔV2 of the relevant battery 1 is compared with a reference voltage drop amount Va. When the voltage drop amount ΔV2 is larger than the reference voltage drop amount Va (ΔV2>Va), the battery 1 is determined to be internally short-circuited (i.e., to be a defective product) and this battery 1 is discarded. In contrast, when the voltage drop amount ΔV2 of the relevant battery 1 is smaller than the reference voltage drop amount Va (ΔV2≤Va), the battery 1 is determined to be normal (i.e., to be a good product not internally short-circuited). In the above manner, the battery 1 is completed.

The present disclosure is described in the above-mentioned embodiment and Examples, but the present disclosure is not limited to the above description and may be embodied in other specific forms without departing from the essential characteristics thereof.

In each of the aforementioned embodiment and Examples, the negative electrode plate 31 is provided with the separator layers 34 each constituted of the polyimide layer 35 and the particle layer 36. Instead of the negative electrode plate 31, alternatively, the positive electrode plate 21 may be provided with separator layers each constituted of a polyimide layer and a particle layer. As another alternative, both the negative electrode plate and the positive electrode plate may also be provided with separator layers each constituted of a polyimide layer and a particle layer.

In the aforementioned separator-integrated electrode plate, the polyimide layer may have a thickness of 10.0 μm or less.

As described above, the polyimide layer is made of polyimide having been melted in a solvent and then deposited as a film. Thus, the ion permeability (or an air-permeation resistance degree used as a yardstick to measure the ion permeability) of the polyimide layer tends to be lower (i.e., tends to be higher in air-permeation resistance degree) than the ion permeability of each of a porous film made of a polyolefin particle layer or a single polyethylene layer to be used in an independent separator, a porous film having a three layer structure (PE/PP/PE, PP/PE/PP, etc.), or a porous film additionally including a heat-resistance layer made of ceramic powder applied on the three-layer porous film.

In contrast, the aforementioned electrode plate in which the thickness of the polyimide layer is 10.0 μm or less can thus ensure the ion permeability (air-permeation resistance degree) of the entire separator layer equal to or higher than the ion permeability of the porous film to be independently used as a separator (the air-permeation resistance degree which is an index to judge the quality of ion permeability of the separator made of a porous film having a layer structure of heat-resistant layer/PP/PE/PP, which is a typical example, is 260 sec/100 ml).

The thickness of the polyimide layer formed on the active material layer was measured by a thickness gauge, model No. T212702 manufactured by Mitsutoyo Corporation.

In the separator-integrated electrode plate, furthermore, the polyimide layer may have a thickness of 6.0 μm or less.

Therefore, this electrode plate in which the thickness of the polyimide layer is 6.0 μm or less can ensure more suitable ion permeability of the entire separator layer.

In the aforementioned separator-integrated electrode plate, the polyimide layer may have a thickness of 0.5 μm or more.

As described above, the resistance to penetration of metal powder, dendrite, or the like through the polyolefin particle layer made of accumulated resin particles (i.e., piercing strength in a piercing test which will mentioned later, used as a yardstick to measure the penetration resistance) tends to be low (the piercing strength also tends to be low) as compared with a porous film made of a polyethylene single layer to be used independently as the separator, a porous film having a three-layer structure such as PE/PP/PE and PP/PE/PP, or a porous film additionally containing a heat-resistant layer made of ceramic powder applied on the above porous film.

In contrast, the aforementioned electrode plate in which the thickness of the polyimide layer having high piercing strength is set to 0.5 μm or more can thus ensure the resistance (the piercing strength) of the entire separator layer equal to or higher than the resistance of a porous film to be used independently as a separator to penetration of metal powder or the like (e.g., 64 mN(=6.5 gf) which is a piercing strength of a separator shown as a typical example in the piercing test, the separator being made of a porous film having a layer structure of heat-resistant layer/PP/PE/PP).

The piercing strength of the separator layer of the separator-integrated electrode plate in the piercing test is evaluated as below. A separator-integrated electrode plate is clamped from both sides, leaving a piercing region of 40 mm in diameter. A needle made of stainless steel having a semi-spherical tip of 300 μm in tip diameter is moved to pierce the center of the piercing region of the separator-integrated electrode plate from the separator layer side at a speed of 0.1 mm/s. At the time when the needle and the electrode plate are electrically connected or conducted to each other, a load on the electrode plate is measured and taken as the piercing strength.

In the aforementioned separator-integrated electrode plate, the polyolefin particle layer may have a thickness falling within a range of 10 μm to 25 μm.

This electrode plate includes the polyolefin particle layer having a thickness of 10 μm or more. If the battery abnormally generates heat, the resin particles of the polyolefin particle layer melt, filling in voids, thereby reliably enabling shut-down of current flowing through the battery. Further, since the thickness of the polyolefin particle layer is also set to 25 μm or less, reduction in the thickness of the separator-integrated electrode plate and reduction in the dimension of the battery incorporating this separator-integrated electrode plate can be achieved.

The thickness of the polyolefin particle layer formed on the polyimide layer was also measured by the aforementioned thickness gauge, model No. T212702 manufactured by Mitsutoyo Corporation.

Furthermore, the capacitor device may include the battery case, the electrode body accommodated in the battery case, the electrode body including the aforementioned separator-integrated electrode plate, and the electrolyte impregnated in the electrode body.

In this battery, the electrode body includes the separator-integrated electrode plate including the polyimide layer in addition to the above-mentioned polyolefin particle layer. Even if foreign substances such as metal powder enter between the present electrode plate and another electrode plate stacked thereon or even if dendrite resulting from deposited metal extends from the another electrode plate, the polyimide layer of the separator layer allows permeation of ions but prevents penetration of the metal powder and the dendrite. Accordingly, a battery can be configured to effectively prevent electrical connection between the active material layer of the electrode plate and the another electrode plate through the metal powder and the dendrite, and hence avoid the occurrence of a short circuit between those electrode plates.

REFERENCE SIGNS LIST

1 Lithium ion secondary battery (Capacitor device)
19 Nonaqueous electrolyte (Electrolyte)
20 Electrode body
21 Positive electrode plate
22 Positive current collecting foil
22c One-side surface
22d Other-side surface
23 Positive electrode active material layer
24 Heat-resistant layer
31 Negative electrode plate (Separator-integrated negative electrode plate, Separator-integrated electrode plate)
31A One-side negative electrode plate
31B Other-side negative electrode plate
31C Inner-side negative electrode plate
32 Negative current collecting foil
32c One-side surface
32d Other-side surface
33 Negative active material layer
34 Separator layer
35 Polyimide layer
36 Particle layer (Polyolefin particle layer)
36P Resin particle (Polyolefin resin particle)
EH Laminating direction
EH1 One side (in laminating direction)
EH2 Other side (in laminating direction)
FH Electrode extracting direction
FH1 First extracting side (in electrode extracting direction)
FH2 Second extracting side (in electrode extracting direction)
S2 Negative electrode plate forming step
S21 Negative active material layer forming step
S22 Polyimide layer forming step
S23 Particle layer forming step
HD1, HD2 Retainer
HD1H, HD2H Through hole
D Diameter (of Through hole)
ND Press needle
NDS Tip (of Press needle)
R Radius (of Tip)
LC Load cell
MH Movable head
SP Moving speed
PS Power source
CM Ammeter

What is claimed is:

1. A separator-integrated electrode plate comprising:
   a current collecting sheet;
   an active material layer provided on the current collecting sheet; and
   a separator layer provided on the active material layer and configured to allow ions contained in electrolyte to permeate through the separator layer,
   wherein the separator layer is formed of:
      a polyimide resin layer, which is a film of a polyimide resin deposited directly on the active material layer, the film being obtained by applying a solution of the polyimide resin and a solvent directly onto the active material layer and then drying the solution; and
      a polyolefin particle layer, which is a layer of polyolefin resin particles accumulated directly on the polyimide resin layer, the polyolefin resin particles having a melting point of 140° C. or less.

2. The separator-integrated electrode plate according to claim 1, wherein the polyimide resin layer has a thickness of 10.0 µm or less.

3. The separator-integrated electrode plate according to claim 2, wherein the polyimide resin layer has a thickness of 6.0 µm or less.

4. The separator-integrated electrode plate according to claim 3, wherein the polyimide resin layer has a thickness of 0.5 µm or more.

5. The separator-integrated electrode plate according to claim 4, wherein the polyolefin particle layer has a thickness falling within a range of 10 µm to 25 µm.

6. A capacitor device comprising:
   a battery case;
   an electrode body accommodated in the battery case, the electrode body including the separator-integrated electrode plate set forth in claim 4; and
   an electrolyte impregnated in the electrode body.

7. The separator-integrated electrode plate according to claim 3, wherein the polyolefin particle layer has a thickness falling within a range of 10 µm to 25 µm.

8. A capacitor device comprising:
   a battery case;
   an electrode body accommodated in the battery case, the electrode body including the separator-integrated electrode plate set forth in claim 3; and
   an electrolyte impregnated in the electrode body.

9. The separator-integrated electrode plate according to claim 2, wherein the polyimide resin layer has a thickness of 0.5 µm or more.

10. The separator-integrated electrode plate according to claim 9, wherein the polyolefin particle layer has a thickness falling within a range of 10 µm to 25 µm.

11. A capacitor device comprising:
    a battery case;
    an electrode body accommodated in the battery case, the electrode body including the separator-integrated electrode plate set forth in claim 9; and
    an electrolyte impregnated in the electrode body.

12. The separator-integrated electrode plate according to claim 2, wherein the polyolefin particle layer has a thickness falling within a range of 10 µm to 25 µm.

13. A capacitor device comprising:
    a battery case;

an electrode body accommodated in the battery case, the electrode body including the separator-integrated electrode plate set forth in claim 12; and an electrolyte impregnated in the electrode body.

14. A capacitor device comprising:

a battery case;

an electrode body accommodated in the battery case, the electrode body including the separator-integrated electrode plate set forth in claim 2; and an electrolyte impregnated in the electrode body.

15. The separator-integrated electrode plate according to claim 1, wherein the polyimide resin layer has a thickness of 0.5 μm or more.

16. The separator-integrated electrode plate according to claim 15, wherein the polyolefin particle layer has a thickness falling within a range of 10 μm to 25 μm.

17. A capacitor device comprising:

a battery case;

an electrode body accommodated in the battery case, the electrode body including the separator-integrated electrode plate set forth in claim 15; and an electrolyte impregnated in the electrode body.

18. The separator-integrated electrode plate according to claim 1, wherein the polyolefin particle layer has a thickness falling within a range of 10 μm to 25 μm.

19. A capacitor device comprising:

a battery case;

an electrode body accommodated in the battery case, the electrode body including the separator-integrated electrode plate set forth in claim 18; and an electrolyte impregnated in the electrode body.

20. A capacitor device comprising:

a battery case;

an electrode body accommodated in the battery case, the electrode body including the separator-integrated electrode plate set forth in claim 1; and an electrolyte impregnated in the electrode body.

* * * * *